(12) United States Patent
Deshpande

(10) Patent No.: US 7,668,170 B2
(45) Date of Patent: Feb. 23, 2010

(54) ADAPTIVE PACKET TRANSMISSION WITH EXPLICIT DEADLINE ADJUSTMENT

(75) Inventor: Sachin Govind Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 461 days.

(21) Appl. No.: 11/743,547

(22) Filed: May 2, 2007

(65) Prior Publication Data

US 2008/0273533 A1    Nov. 6, 2008

(51) Int. Cl.
    H04L 12/56    (2006.01)
(52) U.S. Cl. .............. 370/394; 370/395.4; 370/509
(58) Field of Classification Search .............. None
    See application file for complete search history.

(56) References Cited

U.S. PATENT DOCUMENTS

| | | | |
|---|---|---|---|
| 5,392,280 | A | 2/1995 | Zheng |
| 5,802,311 | A | 9/1998 | Wronski |
| 6,031,584 | A * | 2/2000 | Gray .............. 375/240.28 |
| 6,157,674 | A | 12/2000 | Oda et al. |
| 6,351,471 | B1 | 2/2002 | Robinett et al. |
| 6,498,865 | B1 | 12/2002 | Brailean et al. |
| 6,609,149 | B1 | 8/2003 | Bandera et al. |
| 6,747,991 | B1 | 6/2004 | Hemy et al. |
| 7,002,985 | B2 | 2/2006 | Dertz et al. |
| 2002/0093930 | A1 | 7/2002 | Dertz et al. |
| 2002/0131443 | A1 | 9/2002 | Robinett et al. |
| 2003/0233464 | A1 | 12/2003 | Walpole et al. |
| 2003/0236904 | A1 | 12/2003 | Walpole et al. |
| 2004/0125816 | A1 | 7/2004 | Xu et al. |
| 2004/0136409 | A1 | 7/2004 | Robinett et al. |
| 2004/0194142 | A1 * | 9/2004 | Jiang et al. .............. 725/96 |
| 2005/0105486 | A1 | 5/2005 | Robinett et al. |
| 2005/0169312 | A1 | 8/2005 | Cakareski et al. |
| 2006/0026294 | A1 | 2/2006 | Virdi et al. |
| 2006/0153217 | A1 | 7/2006 | Chu et al. |
| 2006/0164987 | A1 | 7/2006 | Ruiz Floriach et al. |
| 2006/0165088 | A1 | 7/2006 | Monta et al. |
| 2007/0058557 | A1 | 3/2007 | Cuffaro et al. |

FOREIGN PATENT DOCUMENTS

| | | |
|---|---|---|
| EP | 1 432 183 A2 | 6/2004 |
| EP | 1 619 839 A1 | 1/2006 |
| JP | 09312656 | 12/1997 |
| JP | 2002094533 | 3/2002 |
| WO | WO 03/041055 A1 | 5/2003 |
| WO | WO 2004/010250 A2 | 1/2004 |

(Continued)

OTHER PUBLICATIONS

The ns Manual (formerly ns Notes and Documentation), The VINT Project, [online], [retrieved on Jun. 2, 2006]. Retrieved from the Internet<URL:http://www.isi.edu/nsnam/ns/>.

(Continued)

*Primary Examiner*—Chirag G Shah
*Assistant Examiner*—Daniel Mitchell
(74) *Attorney, Agent, or Firm*—Michael Blaine Brooks, P.C.; Rosemarie F. Jones; David Ripma

(57) ABSTRACT

The embodiments of the invention relate to source content streaming, particularly to transmitting data units scheduled for dropping or non-transmission. This data unit in the buffer scheduled for dropping is instead transmitted by dropping one or more consecutive data units later in the transmission order in the buffer and which meet a lower priority threshold. In some embodiments, the data unit is transmitted with a modified time value, e.g., a modified timestamp and/or an allowable presentation time range value.

18 Claims, 10 Drawing Sheets

FOREIGN PATENT DOCUMENTS

| WO | WO 2004/056057 A2 | 7/2004 |
| WO | WO 2004/088858 A2 | 10/2004 |
| WO | WO 2005/048606 A1 | 5/2005 |
| WO | WO 2005/101755 A1 | 10/2005 |
| WO | WO 2005/112449 A1 | 11/2005 |
| WO | WO 2006/061801 A1 | 6/2006 |
| WO | WO 2006/064454 A1 | 6/2006 |
| WO | WO 2006/067374 A1 | 6/2006 |

OTHER PUBLICATIONS

Kalman, Mark; Girod, Bernd; Van Beek, Peter, "Optimized Transcoding Rate Selection and Packet Scheduling for Transmitting Multiple Video Streams Over a Shared Channel," ICIP 2005.

Huang, Jie; Krasic, Charles; Walpole, Jonathan; Feng, Wu-Chi, "Adaptive Live Video Streaming by Priority Drop," OGI School of Science and Engineering, Packet Video 2003.

Chakareski, Jacob; Apostolopoulos, John; Girod, Bernd, "Low-Complexity Rate-Distortion Optimized Video Streaming," ICIP 2004.

Kalman, Mark and Girod, Bernd, "Rate-Distortion Optimized Video Streaming with Multiple Deadlines for Low Latency Applications," Dec. 2004, Packet Video Workshop, Irvine CA.

Chou, Philip A., Miao, Zhouron, "Rate-Distortion Optimized Streaming of packetized Media," Technical Report MSR-TR-2001-35, Feb. 2001, Microsoft Research, Redding, CA.

* cited by examiner

| FR. TYPE 490 | FR. NO. 492 | | TIME STAMP IN ms. 494 | PRI. /IMP. 496 | # OF BITS (SIZE) 498 | |
|---|---|---|---|---|---|---|
| I | $fr(t_1^T, b_1^T, p_1^T)$ | $fr1$ | 33 | 7 | B1 | 406 |
| B | $fr(t_2^T, b_2^T, p_2^T)$ | $fr2$ | 66 | 2 | B2 | 408 |
| B | $fr(t_3^T, b_3^T, p_3^T)$ | $fr3$ | 100 | 1 | B3 | 410 |
| P | $fr(t_4^T, b_4^T, p_4^T)$ | $fr4$ | 133 | 6 | B4 | 412 |
| B | $fr(t_5^T, b_5^T, p_5^T)$ | $fr5$ | 166 | 2 | B5 | 414 |
| B | $fr(t_6^T, b_6^T, p_6^T)$ | $fr6$ | 200 | 1 | B6 | 416 |
| P | $fr(t_7^T, b_7^T, p_7^T)$ | $fr7$ | 233 | 5 | B7 | 418 |
| B | $fr(t_8^T, b_8^T, p_8^T)$ | $fr8$ | 266 | 2 | B8 | 420 |
| B | $fr(t_9^T, b_9^T, p_9^T)$ | $fr9$ | 300 | 1 | B9 | 422 |
| P | $fr(t_{10}^T, b_{10}^T, p_{10}^T)$ | $fr10$ | 333 | 4 | B10 | 424 |
| B | $fr(t_{11}^T, b_{11}^T, p_{11}^T)$ | $fr11$ | 366 | 2 | B11 | 426 |
| B | $fr(t_{12}^T, b_{12}^T, p_{12}^T)$ | $fr12$ | 400 | 1 | B12 | 428 |
| P | $fr(t_{13}^T, b_{13}^T, p_{13}^T)$ | $fr13$ | 433 | 3 | B13 | 430 |
| B | $fr(t_{14}^T, b_{14}^T, p_{14}^T)$ | $fr14$ | 466 | 2 | B14 | 432 |
| B | $fr(t_{15}^T, b_{15}^T, p_{15}^T)$ | $fr15$ | 500 | 1 | B15 | 434 |
| I | $fr(t_{16}^T, b_{16}^T, p_{16}^T)$ | $fr16$ | 533 | 7 | B16 | 436 |
| B | $fr(t_{17}^T, b_{17}^T, p_{17}^T)$ | $fr17$ | 566 | 2 | B17 | 438 |

ADAPTIVE PACKET TRANSMISSION WITH EXPLICIT DEADLINE ADJUSTMENT

CROSS-REFERENCE TO RELATED APPLICATIONS

This application is related to co-pending applications with U.S. patent application Ser. No. 11/560,457 filed Nov. 16, 2006, entitled "Content-Aware Adaptive Packet Transmission," and U.S. patent application Ser. No. 11/738,313 filed Apr. 20, 2007, entitled "Packet Scheduling with Quality-Aware Frame Dropping for Video Streaming."

FIELD OF THE INVENTION

The embodiments of the present invention relate to streaming data, particularly to packet transmission scheduling and source pruning.

BACKGROUND

With the proliferation of digital data, various multimedia source contents have been expected to come from various sources and various delivery mediums, including wide area networks, local area networks, broadcasts, cable, and pre-stored media. A multimedia stream, however, may be transmitted, for example, over network segments with varying link capacities. Ways of dynamically adapting a multimedia stream to varying network conditions are thus highly desirable for efficient transmission of the multimedia stream.

SUMMARY

In one aspect, a method of transmitting a data stream, between a sender and a receiver, is provided. The data stream includes a plurality of data units in a transmission order in a buffer, and wherein the plurality of data units includes a first data unit at the front of the buffer and other data units following the first data unit. The method includes the steps of determining a first set of one or more data units based on the data units in the buffer, wherein each data unit in the first set is marked for transmission based on a transmission condition; reading the first data unit at the front of the buffer; and if the first data unit is not part of the determined first set of data units and a priority associated with the first data unit meets an upper threshold condition, then determining a second set of one or more data units, wherein the second set of data units comprises one or more data units later in the transmission order than the first data unit, each of the data units in the second set meets a lower priority threshold and the data units in the second set are in a consecutive transmission order and one of the data units in the second set is a data unit second in transmission order in the buffer; determining one or more data units in the buffer to be dropped based on the determined second set of data units; dropping the determined one or more data units in the buffer; and transmitting the first data unit in the buffer with the first data unit associated with a modified time value.

In another aspect, another method of transmitting a data stream, between a sender and a receiver, is provided. The data stream includes a plurality of data units in a transmission order in a buffer, and wherein the plurality of data units includes a first data unit at the front of the buffer and other data units following the first data unit. The method includes the steps of determining a first set of one or more data units based on the data units in the buffer, wherein each data unit in the first set is marked for transmission based on a transmission condition; reading the first data unit at the front of the buffer; and if the first data unit is not part of the determined first set of data units and a priority associated with the first data unit meets an upper threshold condition, then determining a second set of one or more data units, wherein the second set of data units comprises one or more data units later in the transmission order than the first data unit, each of the data units in the second set meets a lower priority threshold and the data units in the second set are in a consecutive transmission order and one of the data units in the second set is a data unit second in transmission order in the buffer; determining an available number of data units from the second set of data units based on a defined maximum value and a count of frames in the second set of data units; determining an actual number of data units to be dropped based on an estimated time to deliver the first data unit, an estimated delivery deadline of the first data unit, and a frame rate per second; and if the actual number of data units to be dropped may be accommodated by the determined available number of data units from the second set of data units, then dropping one or more data units in the buffer based on the actual number of data units and transmitting the first data unit in the buffer with the first data unit associated with a modified time value.

In another aspect, a device adapted to be operably coupled to a network is provided. The device includes a buffer and an explicit deadline adjustment (EDA) module. The buffer is adapted to store data units associated with a source content, said source content comprising a plurality of data units, and wherein the plurality of data units comprises a first data unit at the front of the buffer and other data units following the first data unit. The EDA module is adapted to: read the first data unit at the front of the buffer; receive a first set of one or more data units based on the data units in the buffer, wherein each data unit in the first set is marked for transmission based on a transmission condition; and if the first data unit is not part of the determined first set of data units and a priority associated with the first data unit meets an upper threshold condition, then determine a second set of one or more data units, wherein the second set of data units comprises one or more data units later in the transmission order than the first data unit, each of the data units in the second set meets a lower priority threshold and the data units in the second set are in a consecutive transmission order and one of the data units in the second set is a data unit second in transmission order in the buffer; determine one or more data units in the buffer to be dropped based on the determined second set of data units; drop the determined one or more data units in the buffer; and transmit the first data unit in the buffer with the first data unit associated with a modified time value.

In another aspect, a system is provided which includes a sender and a receiver. The sender is operably coupled to the receiver via one or more network segments. The sender includes a buffer and an explicit deadline adjustment (EDA) module. The buffer is adapted to store data units associated with a source content, said source content comprising a plurality of data units, and wherein the plurality of data units comprises a first data unit at the front of the buffer and other data units following the first data unit. The EDA module is adapted to: read the first data unit at the front of the buffer; receive a first set of one or more data units based on the data units in the buffer, wherein each data unit in the first set is marked for transmission based on a transmission condition; and if the first data unit is not part of the determined first set of data units and a priority associated with the first data unit meets an upper threshold condition, then determine a second set of one or more data units, wherein the second set of data units comprises one or more data units later in the transmission order than the first data unit, each of the data units in the second set meets a lower priority threshold and the data units in the second set are in a consecutive transmission order and one of the data units in the second set is a data unit second in transmission order in the buffer; determine one or more data units in the buffer to be dropped based on the determined second set of data units; drop the determined one or more data units in the buffer; and transmit the first data unit in the buffer with the first data unit associated with a modified time value. The receiver is adapted to receive the transmitted data units transmitted by the sender.

BRIEF DESCRIPTION OF THE DRAWINGS

The present invention is illustrated by way of example and not limitation in the figures of the accompanying drawings, and in which:

FIG. 4 is a table representing exemplary frames in an exemplary transmission buffer, according to an embodiment of the invention;

DETAILED DESCRIPTION

Figure 1:
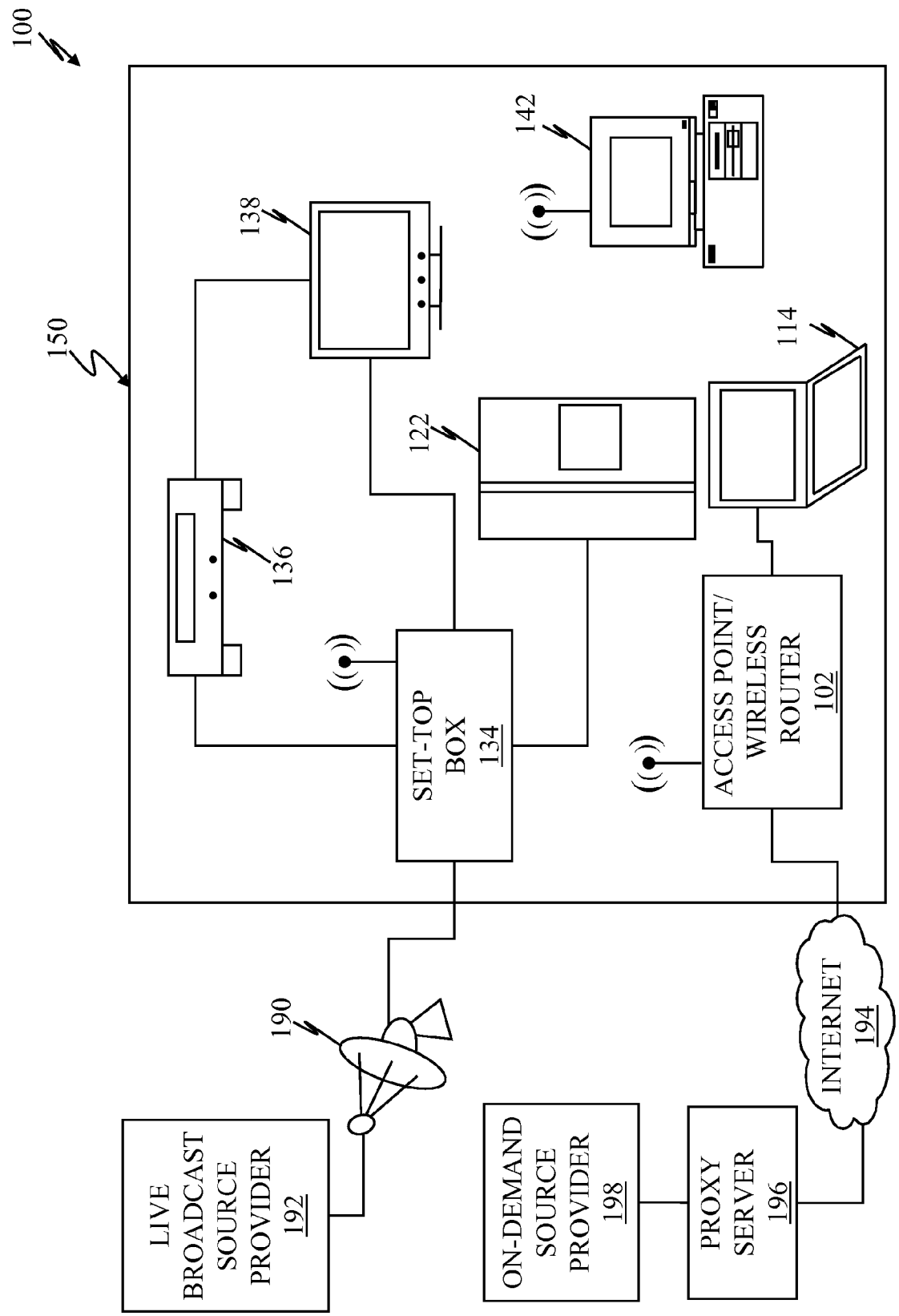
FIG. 1 is a high-level block diagram of an exemplary system, according to an embodiment of the invention.
Figure 2:
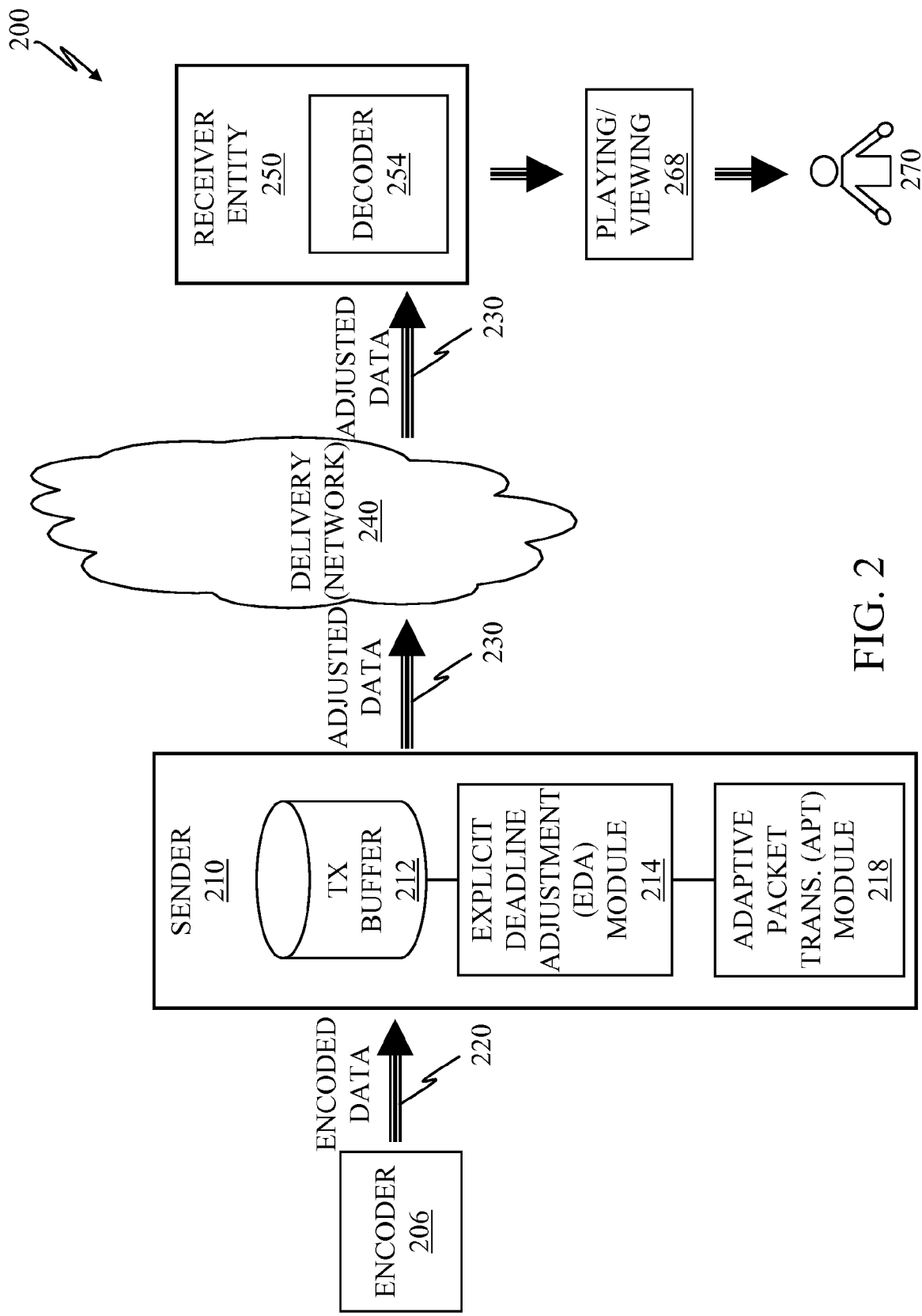
FIG. 2 is a high-level block diagram of an exemplary explicit deadline adjustment (EDA) system adapted to stream source content, according to an embodiment of the invention.

To better understand the figures, reference numerals within the one hundred series, for example, 134 and 190, are initially introduced in FIG. 1, reference numerals in the two hundred series, for example, 210 and 250, are initially introduced in FIG. 2, and so on and so forth. So, reference numerals in the four hundred series, e.g., 408 and 410, are initially introduced in FIG. 4.

The embodiments of the present invention generally relate to streaming source content or media, such as video—both visual and audio, streaming visual data, streaming audio data, and streaming control data. Streaming media, in general, is the transfer of source content so that this content may be received as a continuous real-time stream. Such streaming source content may be from pre-stored or live data, and/or from one sender to one or more clients or receivers. Streamed source content elements or data units are typically transmitted by a sender, e.g., a server/server application or sender entity, and received by a receiver, e.g., client/client application or receiver entity. The receiver or client typically may start presenting or playing back the source content as soon as the receiving client application has sufficient data units or content elements stored in its receiving buffer. The playback or presentation typically continues until the end of the presentation of the source content.

The streaming source content is typically transmitted via one or more network segments. These network segments, however, are typically transmission channels with time-varying channel conditions. For example, the available bandwidth of a wireless link based on the 802.11 specification may vary over time and may be unpredictable due to various conditions, such as varying and unknown distance between the sender and the receiver, radio frequency (RF) interference, fading, collisions with other traffic, network congestion, and other influences. The embodiments of the present invention generally dynamically adapt a source content stream, which may be a multimedia stream, to varying network conditions by scheduling the transmission of the source content stream, dropping some data units of that stream, and/or modifying the timestamp of one or more transmitted data units of the stream.

The embodiments of the present invention provide for exemplary explicit deadline adjustment (EDA) processes. An EDA process in general enables a sender to adjust, typically by postponing or delaying the deadline of a data unit, for example, a frame, which is estimated to miss its deadline by actively dropping one or even more less important frames subsequent to that data unit in the transmission buffer and sending that data unit with an adjusted, typically, delayed timestamp and/or with a custom field indicating when such a data unit may be presented at the client. Thus, a data unit or frame estimated to not meet its delivery deadline may thus still be accordingly transmitted, and when received by the receiver, accordingly decoded and displayed at the receiver based, for example, on the adjusted or delayed timestamp.

In some embodiments, the source content stream may include both a video stream and an associated audio stream. The source content stream of the present invention may be a multimedia stream, which may include videos, images, audio, text, graphics, and other multimedia elements typically known to those of ordinary skill in the art. In some embodiments, the EDA process may be applied to a video stream with no change to the associated audio stream, if the explicitly deadline-adjusted data unit is accommodated by generally dropping one or two future frames—i.e., data units later in a transmission buffer. The International Telecommunications Union Radiocommunications Sector (ITU-R) BT.1359-1— Relative Timing of Sound and Vision for Broadcasting, and the Advanced Television Systems Committee (ATSC) IS191 provides or allows some lag between audio and video. The EDA processes of the present invention typically provide lags that are typically temporary and non-accumulative. In some embodiments, where a video content has no associated audio component, the exemplary EDA processes described herein may be applied with having a data unit postponed for one or more data units or frames later in the presentation timeline.

A multimedia source content, for example, may contain a number of media objects, e.g., audio and video. For example, in some embodiments, if the video stream has an associated audio stream, the EDA process may generally still be applied by having the audio stream be time-scaled to support the EDA process. Furthermore, the exemplary EDA processes described herein are different from conventional adaptive media playout processes. An adaptive media playout process in general considers the amount of data buffered at the client and possible underflow conditions in determining whether to apply an adaptive media playout process. The EDA process, however, is generally applied to an important frame or data unit based on an estimation, typically performed at the sender side, that such data unit if transmitted is going to miss its deadline or is going to be received by a receiver past its deadline, regardless of the amount of data in the receiver buffer when the EDA process is applied. An audio may be time-scaled, for example, using algorithms known to those skilled in the art. A number of audio time-scale modification algorithms are available. In general, there are two main categories of algorithms-namely phase vocoders and time-domain algorithms. For example a time-domain algorithm may be used for audio adaptive media playout (AMP) because of the lower complexity of time domain algorithm. Audio AMP is a process or technique related to varying the speed of audio playout. There are many variant algorithms in the time-domain category such as, but not limited to, Overlap and Add (OLA), Synchronous Overlap and Add (SOLA), Pitch Synchronous Overlap and Add (TD-PSOLA and/or PSOLA), and Waveform Similarity Overlap-Add (WSOLA). Such time-scaling operations are known to those skilled in the art.

FIG. 1 is an exemplary diagram of a system 100 wherein digital source content, such as audio and/or visual/image, data, are transmitted or streamed according to some embodiments of the invention. In this exemplary embodiment, a local network 150 includes a number of consumer electronics, including a set-top box 134, a digital television (DTV) 138, a wireless personal computer (PC) 142, a digital video or versatile disc (DVD) player 136, a computer laptop 114, a gateway/router 102, and a consumer appliance/device 122, connected via various network links or segments. These various consumer electronics are typically adapted to be networked with each other. Examples of consumer appliances that may be networked into the system 100 include televisions and refrigerators with user interfaces, including displays, radios adapted to receive streaming source contents, and any other devices adapted to receive source contents via the network and present them accordingly. The local network 150 comprises various networks—e.g., power line communication (PLC) networks, 802.1a wireless networks, 802.11g wireless networks, and 802.11b wireless networks. Future network specifications such as 802.11n may also be incorporated in such networks. The local network 150 may be operably coupled to one or more source content providers 192, 198, for example, via satellite, cable, and/or terrestrial broadcast 190 or via an external wide area network, such as the Internet 194. A source content provider 192, 198 may provide pre-encoded and stored source content and/or live real-time or substantially real-time encoded source content to be received by a receiver/client and accordingly be presented in a user interface. For example, a movie may be requested from a source provider 198 that provides on-demand pre-encoded and stored data. The encoded source content is then transmitted and streamed over network segments, which may include wide, local, and/or metropolitan area network segments. This source content is then received by a set-top box 134, for example, via a home wireless network and presented by a digital television 138. In some embodiments, a source provider or an intermediate network node also has one or more proxy servers 196 that are operably connected to the source provider 198. A proxy server 196 thus may be a node in the system, for example, where source contents may directly or indirectly be requested. Although the receivers or clients of such streaming media content are depicted to be within a local area network, the embodiments of the invention may also apply to other types of receivers, for example, mobile devices adapted to receive and/or present wireless streaming source content. These wireless devices may also be incorporated in vehicles.

FIG. 2 is a high-level block diagram 200 showing an exemplary explicit deadline adjustment (EDA) system for the delivery of streaming media or source content, which may be employed over variable bit-rate channels or links. The EDA system 200 of the present invention drops data units of a source content, typically of an encoded source content, and moreover, adjusts one or more timestamps of data units of this source content.

For illustrative purposes, let us assume that a media source provider 192, 198 is providing streaming source content to a consumer 270, via a presentation 268 by a receiver 250. The original source content may have been previously captured or captured in real-time. In general, the original source content, which may be in analog or digital form, may be captured and/or encoded 206 by an encoder module 206. The step of encoding 206 typically includes dividing the original source content into one or more components, e.g., data units, and compressing such components into one or more encoded source content data units. The structure, format, and/or data contained in the source content and the data units may depend on the compression technology, e.g., codec or standard being supported. Examples of standards include Moving Picture Expert Group (MPEG) MPEG-2, MPEG-4, H.263, H.264, and Scalable Video Coding (SVC). The encoded source data units of the source content are typically received and processed by a sender 210. The encoder module 206 and the sender module 210 may be embodied in separate or the same entities, such as devices or applications, e.g., the sender functions both as an encoder and a sender. For example, encoded data 220 may be encoded and transmitted by a media provider to the sender 210, which in some embodiments may be regarded as a proxy server. The sender 210 processes the received encoded data 220, particularly, by applying the one or more exemplary EDA processes described herein, and accordingly transmits the filtered and adjusted data 230 to one or more receivers 250.

A sender 210 is also sometimes referred to as a server, sender module, or a sender entity. In general, the sender performs the EDA processes described herein. Typically, the sender performs the EDA process on encoded source contents, including their encoded data units. A source content, including its data units, 220 is typically stored, e.g., in a transmission (TX) buffer 212 prior to transmission to the receiver 250 by a transmitting module, which may be incorporated in the same module as the explicit deadline adjustment (EDA) module 214.

The adaptive packet transmission (APT) module 218, in general, interfacing with the TX buffer 212 determines a set of data units or identifies the data units in the TX buffer that are to be transmitted, based on some conditions, e.g., optimization conditions. In some embodiments, the data units included in this set are based on calculations determining whether data units in the TX buffer 212, if actually transmitted, are going to meet their associated delivery deadlines, e.g., be received by the designated receiver before the delivery deadline. This set typically excludes data units in the TX buffer which are estimated or calculated to not meet their delivery deadlines. This APT process 218 may be performed by the adaptive and selective transmission (AST) processes disclosed in the pending U.S. Application, entitled "Content-Aware Adaptive Packet Transmission" by the same inventor as this application, filed on Nov. 16, 2006 with Ser. No. 11/560,457, herein referred to as "Content-Aware U.S. Application." The Content-Aware U.S. Application is herein incorporated in its entirety for the purpose of disclosing the APT processes/AST processes described in such patent application. Other APT processes known to those skilled in the art, particularly in determining the set as described herein, may also be performed by the exemplary APT module 218. Such APT processes may also include the APT processes disclosed in the pending U.S. patent application entitled "Packet Scheduling with Quality-Aware Frame Dropping for Video Streaming" with Ser. No. 11/783,313, filed Apr. 20, 2007—which is hereby incorporated in its entirety for the purpose of disclosing exemplary APT processes. Other APT processes known to those skilled in the art may also be applied, such as rate distortion optimized packet scheduling processes and algorithms.

The EDA module 214, in general, interfacing with the TX buffer 212 and the APT module 218, may handle or perform the transmission or streaming of the data units in the transmission buffer 212 to the receiver 250. In other embodiments, a module within the sender 210 or separate but interfacing with the sender 210 may also be included in the system, not shown, to perform transrating and/or transcoding functions. Typically, the transrating and/or transcoding functions are performed prior to applying the EDA process. Typically transrating and/or transcoding is performed as part of the encoding process 206 as shown. The EDA module 214, furthermore, interfacing with the TX buffer 212 and/or the APT module 218, determines which of the data units, e.g., frames, in the TX buffer 212 are to be transmitted or dropped/omitted, i.e., not transmitted. Furthermore, some of the transmitted data units may be adjusted, by changing their associated timestamps, and consequently their delivery deadlines. The filtered and adjusted data 230, herein also called as adjusted data, are then delivered or transmitted 240, for example, via one or more network segments 240, wired or wireless, using a transport protocol, which may include user datagram protocol (UDP), transmission control protocol (TCP), real-time transport protocol (RTP), RTP control protocol (RTCP), and the like. The adjusted data 230 is then received by the receiver 250, which typically includes a decoder module 254, which then decodes the adjusted data for presentation 268 to a user/consumer 270. The decoder 254, to appropriately decode the received adjusted data 230, typically supports the decompression and codec scheme performed by the encoder, i.e., adapted to support a common interpretation scheme such that the decoder is able to reconstruct the bit stream into a format that may be used for presentation. A receiver is also referred to as a receiving entity or a client. In some embodiments, the receiver sends feedback about stream reception to the sender. In other embodiments, this feedback may be sent using RTCP protocol. The receiver, for example, may be embodied as a media player. The embodiments of the present invention may also apply to situations wherein a sender transmits streaming source content to more than one receiver (not shown), for example, in a multi-cast environment. In some embodiments, a different set of adjusted data 230 may be sent to a first receiver and another different set of adjusted data 230 may be sent to a second receiver (not shown). A sender may perform the EDA process per receiver. Moreover, a sender may perform the EDA process based on a condition, such as the average network condition of all receivers or the worst restrictive network condition among participants of a session. The EDA process may also be performed for only a subset of receivers within a session, applied randomly on random receivers, and in other varying means. One of ordinary skill in the art will appreciate that the EDA feature of the present invention may be applied in various manners.

Figure 3:
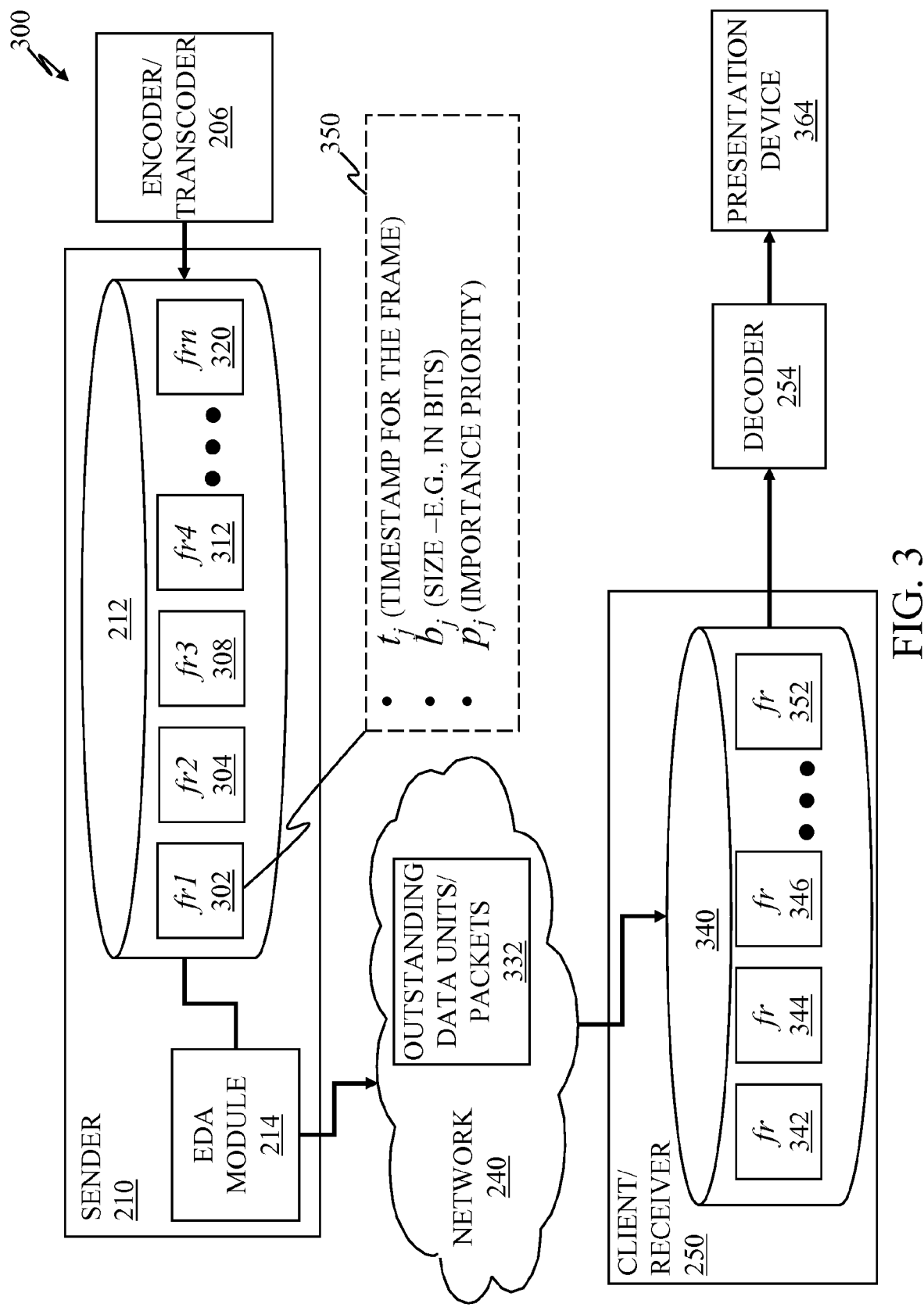
FIG. 3 is a block diagram of another exemplary EDA system, showing data units in a transmission buffer and a receiver buffer, according to an embodiment of the invention.

FIG. 3 is a high-level diagram 300 showing the exemplary EDA system 100, 200 with finer details, according to some embodiments of the invention. For illustrative purposes, let us assume that the source content is video data. In some embodiments, transcoding may be performed 206 so as to adapt or adjust the format, resolution, or bit rate of the video data to the network condition. Based on the coding process or specification employed, a source content is typically divided into one or more data units. Using MPEG coding schemes, for example, a video may be divided into data units that are embodied as frames. In other embodiments, a source content may be divided into other data units such as video slices, group of frames, group of pictures, group of slices, fields, layers, or macroblocks. These data units may be further subdivided, e.g., a frame may correspond to several transmission data units, such as packets. Thus, a frame may correspond to one or more packets, e.g., RTP or UDP packets. Other variations in the manner of packetizing data units are expected and within the scope of the present invention. In some embodiments, each frame is typically embodied and transmitted as multiple packets. Although the embodiments of the present invention are exemplified herein generally using frames, other data units may also apply. In this example, the source content is divided into frames, thus the exemplary EDA process is described herein to selectively drop, transmit, or adjust data units at the frame level. The EDA process, however, exemplified herein may also selectively process data units other than at the frame level, e.g., process data units at a sub-frame or packet level, or process data units as groups of pictures (GOPs), slices, pictures, groups of slices, fields, layers, macroblocks, or based on other data unit size embodiments. The EDA process may also be applied to only portions of the source content and/or portions of data units in the TX buffer.

In this example, the TX buffer 212 contains several data units, which are frames fr1 302, fr2 304, fr3 308, fr4 312, . . . frn 320. Frame fr1 may also be represented as $fr(t_j, b_j, p_j)$. In this example, each frame j 302-320, in the sequence of frames making up the data stream, may be associated with a number of information 350, such as a size $b_j$—which may be in bits or bytes, for example. Furthermore, each frame j is also typically associated with a timestamp, $t_j$, typically indicating by which time all packets, constituting a coded frame, have to be decoded by a decoder, typically at the receiver, for presentation. This timestamp thus is also associated with the delivery deadline of, by which time all packets, constituting a coded frame, have to arrive at the client to enable successful decoding. If the frame arrives at the client later than the designated delivery deadline that frame is typically discarded and not decoded for presentation. Each frame j is also associated with an importance or priority index, $p_j$, which may be based on the coding dependency of the frame, which is typically based on the coding specification applied. In other embodiments, not shown, a frame may be associated with a custom field, which may be embodied as part of the header and/or payload information. This custom field may contain a position or index value, which may be applied for example to define a range of time values indicating when a data unit may be presented at the client side. In some embodiments, this custom field may also contain the time range values. One of ordinary skill in the art will appreciate that this custom field may be divided over several fields or variables and still be in the scope of the present invention.

Based on the coding specification, the decoding of a frame may depend on the successful decoding of other frames. Some frames in the data stream, for example, may be used as references to code other frames, i.e., inter-frame coding. For example, an I-frame may be used as reference to code a P-frame, while a P-frame may be used as reference to code another P-frame or a B-frame. In the H.264/Advanced Video Coding (AVC) specification or standard, a B-frame may also be used as a reference frame. This B-frame dependency, however, was not implemented in previous standards, such as in MPEG-2. H.264 has been adopted by the Moving Picture Experts Group (MPEG) standards to be a video compression scheme. This standard is also known by other names, including Joint Video Team (JVT), ITU-T H.26L, MPEG-4 AVC, or ISO MPEG-4 part 10. The embodiments of the invention may also apply to other video encoding and/or decoding standards, other file formats, and generally to source contents that are encoded, transmitted, and decoded, particularly utilizing a transmission buffer. Various coding dependencies of various specifications and/or standards are known to those skilled in the art.

Coded data 302, 304, 308, 312, 320 ready for possible transmission to the client are typically stored or held in the TX buffer 212. The EDA module 214 then performs an EDA process on the data units in the TX buffer 212. Typically, the EDA process is performed at each transmission opportunity to one, some, or all data units in the TX buffer 212. In some embodiments, the EDA process is performed every time a new data unit is at the front of the transmission. Once the EDA process is performed, the first data unit or the data unit at the front/start of the TX buffer, which in this example is frame fr1 302 may then be dropped/omitted/discarded, i.e., not transmitted to the client, or may be transmitted to the receiver 250. Furthermore, in some embodiments, one or more data units in the TX buffer following the first data unit may also be accordingly dropped and the timestamp associated with the first data unit accordingly adjusted or delayed. The EDA module 214, in some embodiments, may have the capability to decide to transmit or drop entire frames. The frames 302-320 in the TX buffer 212 are also typically transmitted by the EDA 214 in their decoding or transmission order. The data units contained in a TX buffer are also typically stored in transmission order. In general, this order implies that fr1 302 is the first frame in the TX buffer scheduled to be transmitted, fr2 304 is the next frame schedule to be transmitted, and frn 320 is the last frame scheduled to be transmitted. This transmission order may depend on the timestamps associated with each frame. The contents of a TX buffer 212 may also change, for example, other frames may be added to the TX buffer, which are usually added at the end or as the last frame(s) in the TX buffer. Although data units are in a TX buffer 212, the embodiments of the present invention selectively drop one or more data units in the TX buffer, so as to provide efficiency in the transmission and receiving process of the source content.

Data units, in this example, frames—consisting of one or more packets, may be received at the client/receiver 250. These received data units 342, 344, 346, 352 are typically held in a client receiver (RX) buffer 340 before being decoded 254. The RX buffer 340 is illustrated containing several received frames 342-352. These received frames 342-352 are decoded 254 and then rendered or presented at the client, for example, via a presentation device 364, such as a television set. The received frames 342-352 are typically presented based on time values, such as timestamps, associated with such frames.

Data units are typically transported from the sender 210 to the client 250 via one or more network segments 240. A number of data units 332, however, may be outstanding in the network. These data units, e.g., packets, are typically those packets typically transmitted by the application/transport layers of the sender 210, but not yet received by the client 250. The application or transport layer is typically the layer associated with the Open System Interconnection (OSI) reference model. In some embodiments, these outstanding packets or data units are held or stored in intermediate buffers in one or more nodes in the network. In the case of transmission over a wireless link, a number of packets may be held, for example, in a buffer at the media access control (MAC)/physical (PHY) level, typically at the sender side, still to be transmitted. Processes of determining the number of outstanding packets or data units are disclosed in the Content-Aware U.S. Application, which is hereby incorporated in its entirety also for the purpose of disclosing the embodiments of determining the number of outstanding packets. Other existing techniques of estimating the number of outstanding packets may also be employed in the exemplary EDA system of the present invention.

FIG. 4 illustrates exemplary contents of an exemplary TX buffer content 212, according to an embodiment of the invention. The contents are represented by the exemplary table 402. The TX buffer 212, for example, contains seventeen frames 492—fr1 406, fr2 408, fr3 410, fr4 412, fr5 414, fr6 416, fr7 418, fr8 420, fr9 422, fr10 424, fr11 426, fr12 428, fr13 430, fr14 432, fr15 434, fr16 436, and fr17 438. The first frame or the frame at the front of the TX buffer is an I-frame 406, represented as fr1 or $fr(t_1^T, b_1^T, p_1^T)$, while the last frame or the frame at the end of the TX buffer is a B-frame 438—fr17 or $fr(t_{17}^T, b_{17}^T, p_{17}^T)$. One of ordinary skill in the art will appreciate that these frames may be packetized in various manners, e.g., a frame may be packetized into two or more RTP packets (not shown). The transmission order of this exemplary TX buffer is based on the timestamp 494, which is considered the decoding timestamp of the frame. The timestamp 494 is generally associated with a time deadline when the frame has to be decoded by a decoder, typically at the receiver, for presentation. Each frame is also associated or identified with a frame or coding type 490, e.g., "I" for I-frame, "B" for B-frame, and "P" for P-frame. Each frame is also associated with a priority or importance index or value 496, which may be based on the frame type and/or other conditions. The payload size of each data unit, in this case frame, is shown, for example, as the number of bits 498. In this example, frame 7, fr7 418, is a "P-frame" with a sequence number of "7," a timestamp of "233," a priority index of "5," and a payload size represented by "B7."

In some embodiments, as mentioned above, the priority index 496 of a frame may be based on the video compression technology or encoding scheme employed, in particular, the coding dependencies between frames. For example, data units with lesser importance are those that typically minimize the coding dependency chain and/or encoding error propagation. In other embodiments, the priority index may be based on the amount by which the distortion or peak signal-to-noise ratio (PSNR) at the receiver may be decreased, e.g., by calculation or estimation, if the content element/data unit is decoded (on time) at the receiver. The priority index may also be based on the frame type and/or its position in the group of pictures (GOP). In some embodiments, the priority may be based on the temporal level of that frame if such frames are defined with hierarchical structures. In some embodiments, the size 498 of the frame considers also non-payload size, e.g., header information. In this exemplary table, there are 30 frames per second (fps).

In this example, the source content is encoded with an IBBPBBPBBPBBPBBB. Considering the first frame, fr1, 406 is an I-frame 490, and an I-frame is typically a frame that has the most number of frames dependent on it, fr1 406 is assigned a priority or importance value of seven ("7"). In this exemplary embodiment, the priority index/value is from "1" to "7," with "7" being the most important and "1" being the least important. Similarly, the next I-frame, fr16 436, in the next GOP in the TX buffer is also assigned a priority index of "7." The P-frames are then ranked in descending priority value. In this example, a P-frame depends on the closest I- or P-frame preceding such P-frame. Thus, P-frame fr10 424 depends on P-frame fr7 418. Considering such dependency and/or potential decrease in PSNR, the P-frames fr4 412, fr7 418, fr10 424, and fr13 430 are assigned priority values "6," "5," "4," and "3, 496 respectively. Each B-frame in the B-frame pair is also assigned a different priority index. For example, the first B-frame 408 in a B-frame pair 408, 410 is assigned a priority value of "2," while the second B-frame is assigned the priority value of "1." The other B-frame pairs are also accordingly assigned priority values in a similar manner. In other embodiments, not shown, all B-frames may be assigned the same priority value, e.g., all B-frames are assigned priority of "1." Other manners of indicating priority values are expected and still be in the scope of the present invention, e.g., indicating priority using bit masks, using other notations, and the like.

In this exemplary embodiment, let us represent a frame j in the transmission buffer as $fr(t_j, b_j, p_j)$, with:

a) the timestamp of the frame: $t_j$;

b) the size of the frame (e.g., in bits or bytes): $b_j$; and c) the priority or importance index or value: $p_j$.

Generally, at a time, the TX buffer typically consists of a number of frames or data units, for example, as represented in the table 402. For illustrative purposes, let us identify two order sequences for the set of frames in the transmission buffer. The exemplary orders are:

a) by Priority or Importance Index order:

$$S^P = \{fr(t_1^P, b_1^P, p_1^P), fr(t_2^P, b_2^P, p_2^P), \ldots, fr(t_N^P, b_N^P, p_N^P) | p_1^P \geq p_2^P \geq \ldots \geq p_N^P\}$$

where $S^P$ is typically ordered in a monotonic non-increasing order based on priority or importance index/value; and b) by Timestamp Order:

$$S^T = \{fr(t_1^T, b_1^T, p_1^T), fr(t_2^T, b_2^T, p_2^T), \ldots, fr(t_N^T, b_N^T, p_N^T) | t_1^T \leq t_2^T \leq \ldots \leq t_N^T\}$$

where $S^T$ is typically ordered in a monotonic non-decreasing order based on timestamp. The exemplary table 402 is shown in timestamp order.

The APT module 218 of the present invention performs an adaptive packet transmission (APT) process, which typically finds a subset of frames in the transmission buffer for transmission, for example, $$SS^T(t) = \{fr(t_j^T, b_j^T, p_j^T) | \forall j: (t+es_j^T) \leq d_j^T, R(SS^T(t)) \leq R(t_m)\}$$

such that the subset $SS^T(t)$ satisfies some optimization criterion or condition, which may depend on the particular process or algorithm used for adaptive packet transmission. In some embodiments, the set determined by the APT module identifies the frames in the TX buffer that are calculated to arrive at the receiver before their delivery deadlines based on a determined rate of transmission, which may further depend on one or more other conditions. Those frames that are calculated to not arrive at the receiver before their delivery deadlines are typically not part of this exemplary APT set. In some embodiments, the APT subset may include all frames in the transmission buffer.

For further illustrative purpose, let $es_j^T$ be the estimate of time for transmitting $fr(t_j^T, b_j^T, p_j^T)$ and all the frames in the subset, $SS^T(t)$, before such frame in the TX order and the outstanding bytes 332 on the network. The time estimate, for example, may be calculated by an exemplary formula such as:

$$es_j^T = \frac{\left(O_c + \sum_{k=0}^{k=j} b_k^T\right)}{R(t_m)},$$

where t indicates the current time, where $R(t_m)$ is the selected rate of transmission at time $t_m$, where $O_c = O(m) - [(t-t_m)*R(t_m)]$, and where $O(m)$, in general, is the cumulative number of bytes of data payload sent by the sender minus those known to be received by the receiver, which may be determined via feedbacks such as real time transport control (RTCP) receiver reports as disclosed for example in the Content-Aware U.S. Application. The Content-Aware U.S. Application is incorporated herein in its entirety for the purpose of disclosing embodiments of calculating the estimated time for transmitting a frame, e.g., $es_j^T$, and/or disclosing embodiments of calculating outstanding packets.

For further illustrative purpose, let $d_j^T$ indicate the delivery deadline for $fr(t_j^T, b_j^T, P_j^T)$, in transmission order, and $R(t_m)$ is the selected rate of transmission at time $t_m$. The manner of determining $R(t_m)$ may be based on default values, on information exchanged between a sender and a receiver, for example, or via other processes known to those of ordinary skill in the art. The exemplary rate-determination process disclosed in the Content-Aware U.S. Application may also be applied. The Content-Aware U.S. Application is herein also incorporated in its entirety for the purpose of disclosing a manner of determining a rate of transmission.

Figure 5A:
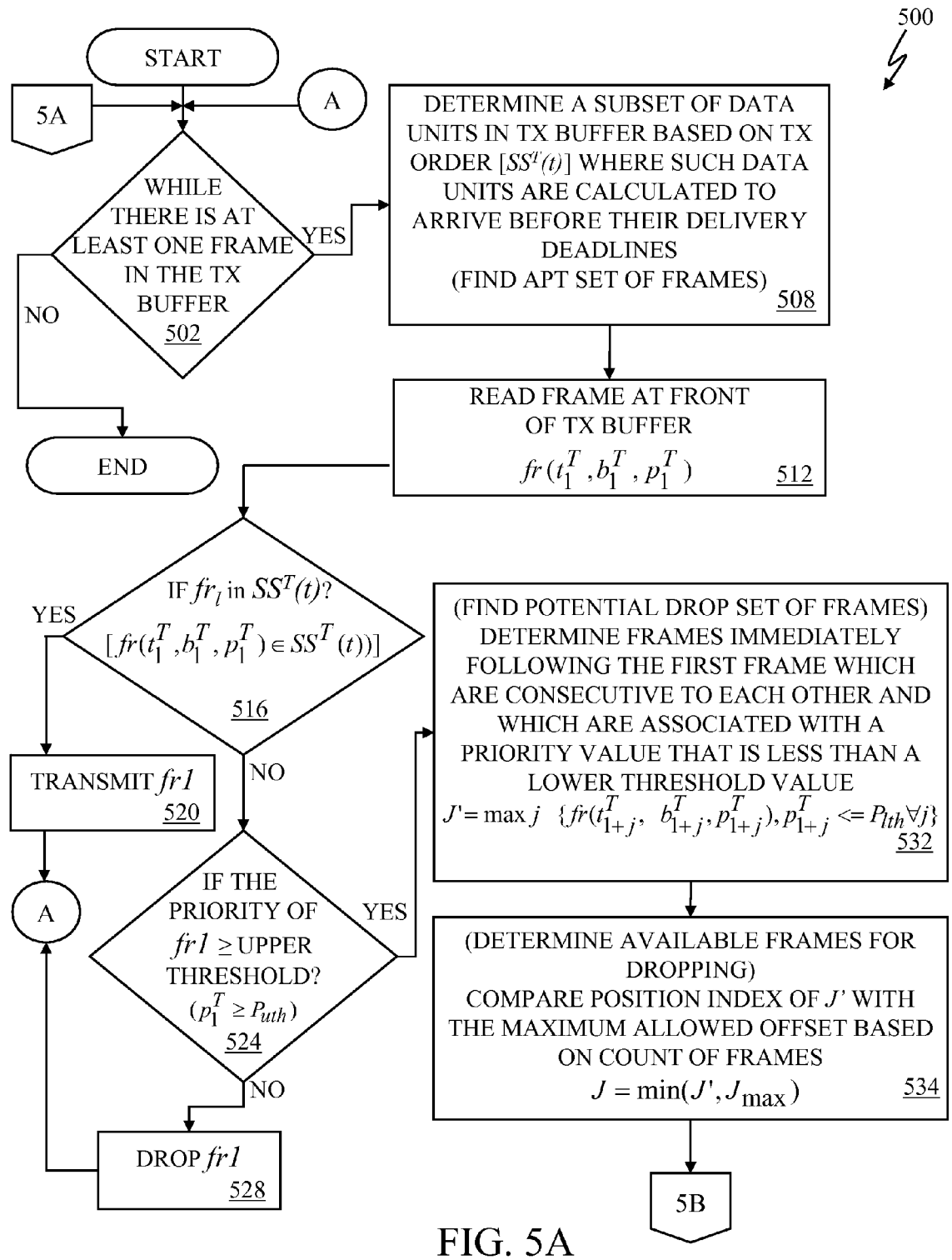
FIGS. 5A and 5B together illustrate an exemplary EDA process, according to an embodiment of the invention.
Figure 5B:
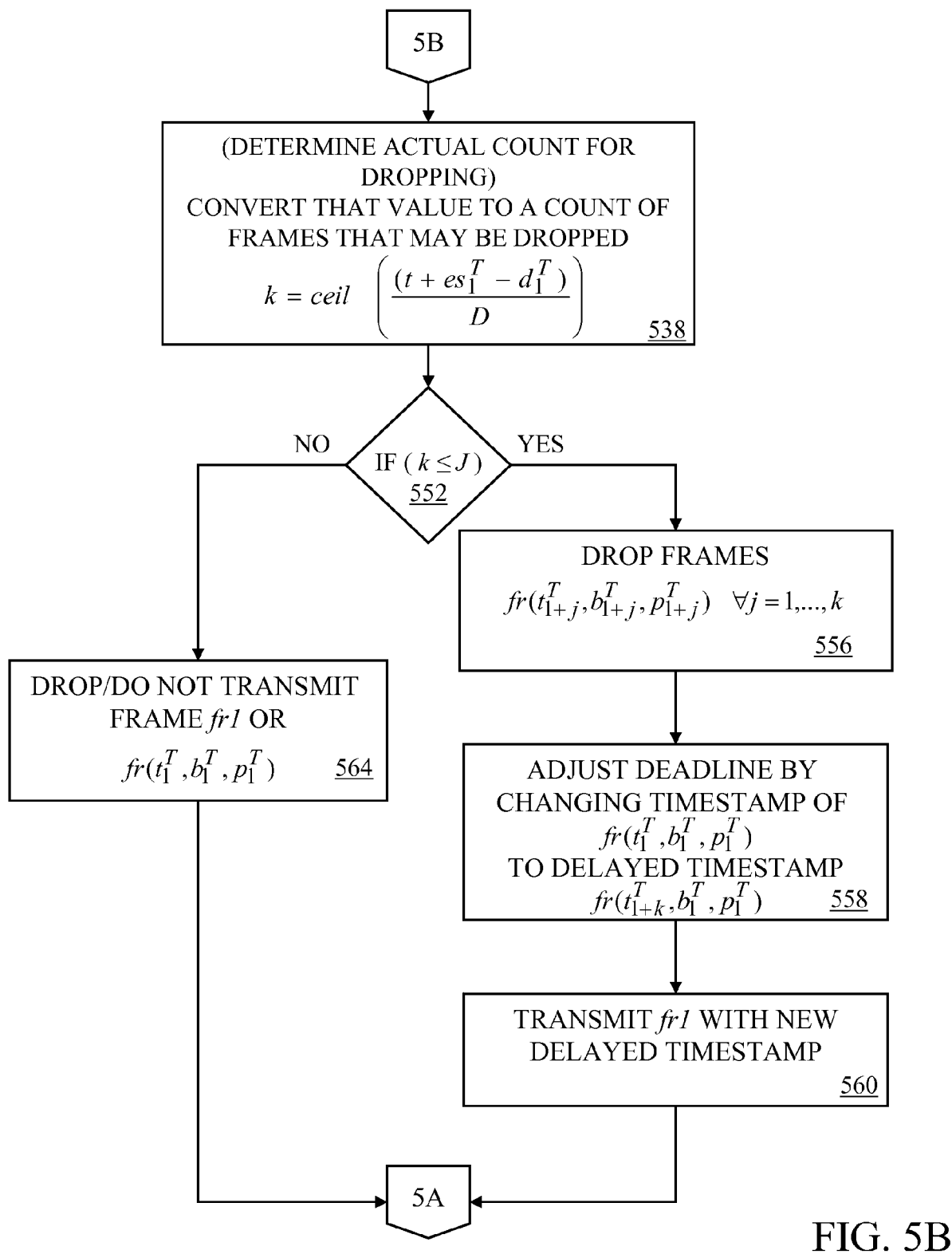

FIGS. 5A and 5B together illustrate an exemplary EDA process 500, according to an embodiment of the invention. In general, the EDA process is performed each time there is a new frame at the front of the TX buffer. The EDA process then accordingly determines if that frame at the front of the TX buffer is to be transmitted or dropped, i.e., not transmitted to the receiver. Furthermore, if the frame at the front of the TX buffer is to be transmitted, it may be transmitted with its original timestamp or be transmitted with a modified and delayed timestamp. This original timestamp is typically the timestamp provided during encoding. The frame at the front of the TX buffer, whether transmitted or dropped, may then be removed from the TX buffer. A new frame may occupy the front of the TX buffer with new frame(s) being added at the end of the TX buffer, and the EDA process may accordingly be repeated. In general, the EDA process is repeated until there are no more frames in the TX buffer, particularly if there is no more frame at the front of the TX buffer. In some embodiments, the EDA process is not performed for each frame in the TX buffer. Variations in the manner of applying the EDA process may be implemented, e.g., the EDA process is performed after five frames in the TX buffer are transmitted, performed once every three seconds, once every transmission opportunity, or based on other conditions. Such variations are expected and still be in the scope of the present invention.

The exemplary EDA process 500, in FIGS. 5A and 5B, shows that the EDA process is repeatedly performed while there is at least one frame in the TX buffer. Although called TX buffer, in some embodiments, not all frames in the TX buffer are actually transmitted to the client. In general, the EDA process is performed whenever a new frame is at the front of the TX buffer, which may be construed as once every transmission opportunity. In the first operation, a determination or check is made to determine if there is at least one frame in the TX buffer (operation 502). If there is no frame in the TX buffer scheduled for transmission, the EDA process ends (operation 502, "no" branch). If there is at least one frame in the TX buffer, (operation 502, "yes" branch), the EDA process in general determines a first set of frames, $SS^T(t)$, from the set of frames in the TX buffer (operation 508). This subset, $SS^T(t)$, or APT set may be determined, for example, via an adaptive packet transmission process performed by an APT module 218 which identifies the frames in the TX buffer for transmission based on one or more conditions. This calculation to determine this APT set of frames is based on having the frames be transmitted in the transmission order. In some embodiments, the APT set of frames, SST(t), includes all the frames contained in the TX buffer. In one embodiment, the APT set is generated by applying an APT/AST process disclosed in the Content-Aware U.S. Application (operation 508).

The frame at the front of the TX buffer, represented by $fr(t_1^T, b_1^T, p_1^T)$, is then read (operation 512). The subscript "1" indicates the position of the frame in the TX buffer. In some embodiments, the EDA process, including the APT process, does not actually read the actual video frame itself Information associated with a frame, such as the timestamp, size, and priority, may be obtained or read from a metadata and/or a data structure that may be separate from the actual frame data itself This data structure or metadata, for example, may be contained in a separate data structure or data stream that may be linked to or be part of the TX buffer itself. This separate data structure, which may include the metadata fields therein, are typically updated when frames are added to or removed from the TX buffer. In some embodiments, it is this data structure that is processed, e.g., read, when determining whether frames are to be dropped, transmitted, and/or modified. Thus, when a frame or a data unit herein is processed, such processing operation(s) may relate, for example, to reading a data structure or metadata associated with the data unit/frame itself and/or the reading of the data unit/frame itself.

A check is then made to determine whether the frame at the front of the buffer, $fr(t_1^T, b_1^T, p_1^T)$ or fr1, is included or identified in the determined APT set of frames, $SS^T(t)$—e.g., checks if $fr(t_1^T, b_1^T, p_1^T) \in SS^T(t)$ (operation 516). If the frame at the front of the TX buffer is part of the APT set of frames (operation 516, "yes" branch), that frame at the front of the TX buffer is accordingly transmitted (operation 520). This frame, $fr(t_1^T, b_1^T, p_1^T)$ or fr1, may also be removed from the TX buffer.

On the other hand, if the frame, fr1, is not indicated as part of the determined APT set of frames (operation 516, "no" branch)—which may indicate that the frame is calculated to not arrive at the receiver before its delivery deadline, the EDA process then checks if the priority, $p_1^T$, of that frame at the front of the TX buffer is greater than a defined priority upper threshold (operation 524)—e.g., $p_1^T \geq P_{uth}$. This priority upper threshold, $P_{uth}$, in some embodiments, may be set equal to the priority value of an I-frame, for example, or to an appropriate high priority value. If the priority associated with the first frame in the buffer does not meet the threshold value, e.g., if the priority of that first frame is not greater than or equal to a defined priority upper threshold value (operation 524, "no" branch), this front frame is accordingly dropped by the EDA process, i.e., not transmitted to the receiver (operation 528). This front frame is also accordingly removed from the front of the TX buffer. In some embodiments, by defining an upper threshold, the EDA process may determine or find frames with certain high priority values which may not have been defined for transmission by the adaptive packet transmission process, e.g., not part of the APT set of frames. The EDA process may then determine whether frames with low priority values may be dropped to accommodate transmission of such high priority frames.

If the priority associated with the frame at the front of the TX buffer, $p_1^T$, does meet the upper threshold condition, e.g., the priority value is greater than or equal to a priority upper threshold value (operation 524, "yes" branch), the EDA process then determines a potential drop set, e.g., by finding all consecutive or contiguous frames later than the first frame in the TX buffer such that these consecutive frames meet a lower threshold condition (operation 532), e.g., a lower priority threshold value—$P_{lth}$. This set of low priority consecutive frames may define a potential drop set, meaning the frames contained in this set may be potentially dropped by the EDA process to accommodate transmission of the first frame in the TX buffer. The lower threshold may be defined so as to indicate frames with low priority values that may be dropped so as to accommodate transmission of the high priority valued first frame. In some embodiments, the lower threshold priority value, $P_{lth}$, may be defined to be equal to the priority value of one of the B-frames, for example. The determination of the set of consecutive frames that may be dropped starts with the frame occupying the second position in the transmission buffer—$fr(t_2^T, b_2^T, p_2^T)$. From this set of consecutive frames, the position index or the position of that frame that is last in the transmission order is accordingly determined and is represented, for example, by J'—which may indicate the offset away or the number of frames away from the first or front frame of the TX buffer. J—, for example, may be represented as $J' = \max j \{fr(t_{1+j}^T, b_{1+j}^T, p_{1+j}^T), p_{1+j}^T <= P_{lth} \forall j\}$ (operation 532). The EDA process, in some embodiments, may perform such operation by reading the second frame of the TX buffer and determining whether such a frame has a priority value meeting the exemplary lower threshold value, and continue doing so for the next later frames until the EDA process reads a frame that does not meet the lower threshold value. The last consecutive frame read prior to the frame that does not meet the lower threshold value is thus the frame associated with the value of J'. The position of that last consecutive frame in the TX buffer may be associated with or be contained in J'. In the next operation (operation 534), the EDA process compares the position index or position value of J' with a defined $J_{max}$ value, and obtains the minimum of these two values as J. The J parameter may provide a number of frames that are available for dropping from the potential drop set. In some embodiments, $J_{max}$ is a value defining the maximum deadline adjustment, which may be based on the perceptually acceptable limits for displaying a frame late. For example, in some embodiments, the $J_{max}$ value for a video represented with 30 fps is one or two, while a video represented with 60 fps is two, three or four, for example. Other conditions to define $J_{max}$ may also be implemented, for example, based on experiments and/or user requirements.

In the next operation, a determination of an actual count of frames that may be dropped is determined so as to accommodate the transmission of the front/first frame in the TX buffer identified by the APT process for non-transmission (operation 538). In some embodiments, the actual count of frames that may be dropped is based on a calculation of the number of frames that has to be dropped to enable the frame at the front of the TX buffer be delivered so as to meet its delivery deadline. For example, the actual count of frames that may be dropped, e.g., k, is represented as:

$$k = \text{ceil}\left(\frac{(t + es_1^T - d_1^T)}{D}\right),$$

where D, for example, represents the interframe spacing, which, in some embodiments, is equal to 1/f, where f is the frame rate, e.g., 30 fps or 60 fps (operation 538). In this exemplary formula, a ceiling function is performed. Other formulas to determine such a count may also be used.

A check is then made to determine if k≦J, indicating whether the determined actual count of frames to be dropped may be accommodated by the number of frames available for dropping from the potential drop set (operation 552). In general, this operation (operation 552) determines if there is a sufficient number of frames later in the transmission buffer that are each associated with a low priority value meeting a defined threshold so as to enable the frame at the front of the TX buffer be delivered and meet its delivery deadline. If k>J (operation 552, "no" branch)—indicating that there is an insufficient number of available low priority consecutive frames later in the transmission order to accommodate transmission of the first frame, the first frame in the TX buffer is accordingly dropped (operation 564). That frame may also be removed from the TX buffer. In some embodiments, the first frame may be transmitted with timestamp of frame 1+J—fr $(t_{1+J}^T, b_{1+J}^T, p_{1+J}^T)$. On the other hand, if k≦J, (operation 552, "yes" branch), indicating that there is a sufficient number of frames in the potential drop set, the frames later in the transmission buffer, starting from the second frame, are dropped, and the number of frames that are dropped is based on the value of k or the determined actual count/number of frames for dropping (operation 556). This operation, for example, may be expressed by dropping all frames, where such frames are $\{fr(t_{1+j}^T, b_{1+j}^T, p_{1+j}^T) \forall j=1, \ldots, k\}$ (operation 556). These frames are also typically removed from the transmission buffer. The timestamp of the first frame in the TX buffer may also be adjusted, such that the original timestamp of the first frame is delayed and replaced with the timestamp of the last frame dropped (operation 558). In some embodiments, the timestamp may be replaced with the timestamp of one of the earlier dropped frames (j=1, . . . , k). The first frame in the TX buffer, fr1, is accordingly transmitted with this modified and delayed timestamp (operation 560). The process is then again repeated, as shown. In some embodiments, not shown, the first frame fr1 is transmitted with a range of time values, as further explained herein.

Figure 6A:
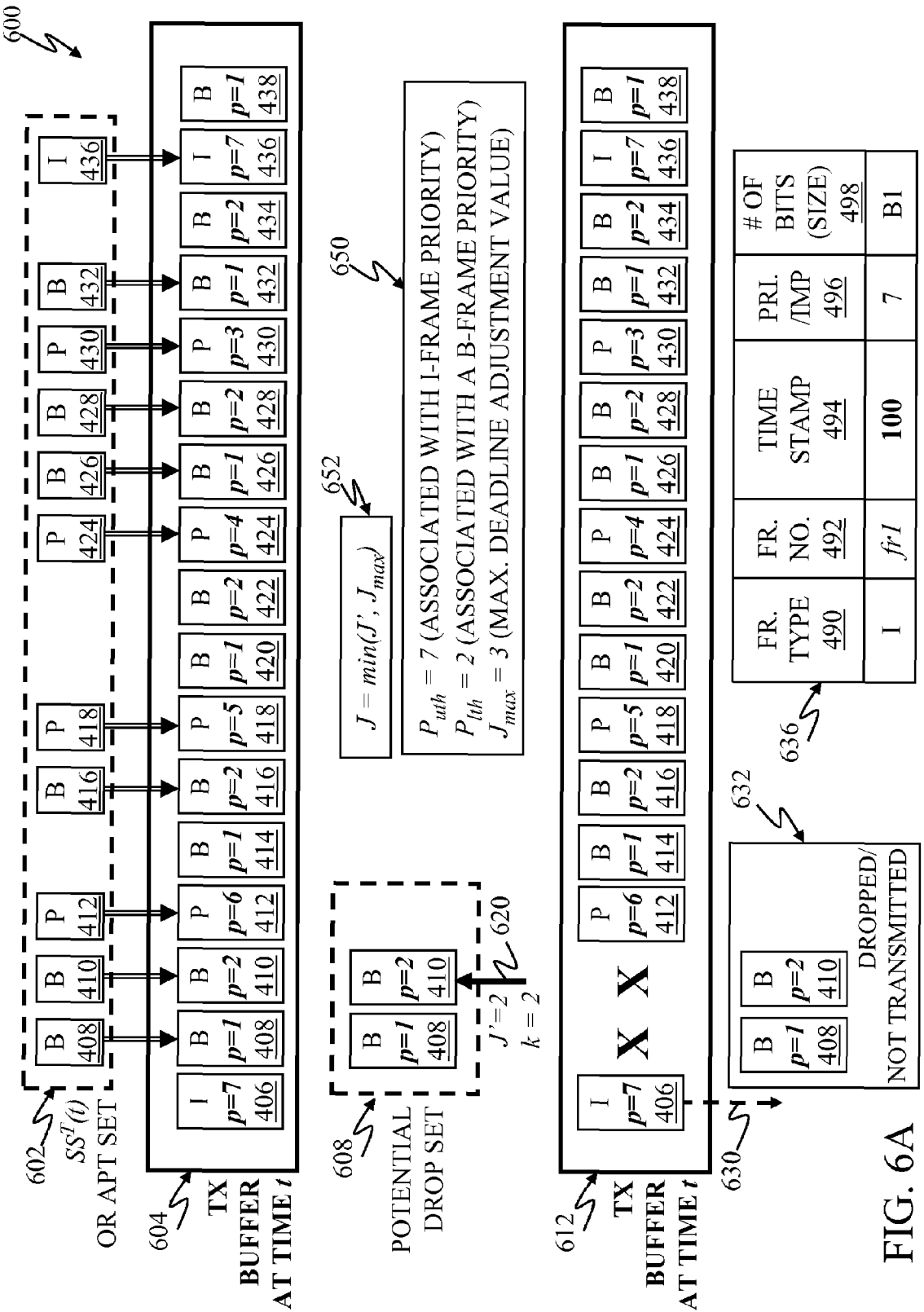
FIGS. 6A and 6B together show various stages of an exemplary transmission buffer when an exemplary EDA process is applied to the data units of an exemplary transmission buffer, according to an embodiment of the invention.
Figure 6B:
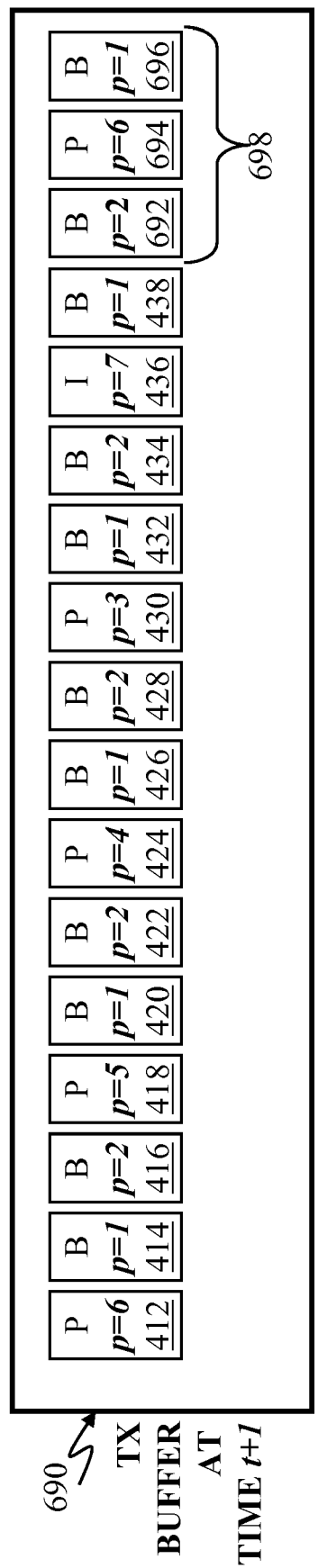

FIGS. 6A and 6B together contain a diagram 600 showing various stages of the exemplary transmission buffer 402 of FIG. 4 when an exemplary EDA process 500 of FIGS. 5A and 5B is applied to the data units or frames of the exemplary transmission buffer, according to an embodiment of the invention. Referring to FIG. 6A, let us assume that the exemplary table 402 is represented by the exemplary diagram 604 in FIG. 6A, where the first I-frame 406 is at the front of the TX buffer and the last B-frame 438 is at the end of the TX buffer at time t. Let us further assume that an exemplary APT process is performed which defines an exemplary APT subset 602 at time t, $SS^T(t)$, as shown (operation 508). This exemplary APT subset includes or contains several frames, each calculated to arrive at the designated receiver before its deadline. This APT set 602 includes several B-frames, P-frames, and an I-frame 408, 410, 412, 416, 418, 424, 426, 428, 430, 432, 436. The first I-frame 406 and some other frames in the TX buffer 414, 420, 422, 434, 438 are calculated by the exemplary APT process to not arrive at the receiver at their designated deadlines and thus are not included in the APT subset 602.

Referring to FIG. 5A, the EDA process reads the first frame in the TX buffer, which in this example, is the first I-frame 406 (operation 512). As exemplified in FIG. 4, the first I-frame 406 has a priority value of "7" 496. Let us further assume that the priority upper threshold value, $P_{uth}$, is defined to be equal to the priority value of an I-frame 650, which in this example, is also "7." For illustrative purposes, let us define the lower priority threshold 650, $P_{lth}$, to be equal to "2," which is one of the B-frames priority values. In this example, a B-frame has a priority value of "2" or "1."

Considering that the first I-frame 406 is not part of the APT subset 602 (operation 516, "no" branch), the EDA process checks if the priority of the I-frame 406 is greater than or equal to the priority upper threshold—$P_{uth}$ (operation 524). Because the I-frame meets this upper threshold priority value, the EDA process then determines a potential drop set 608 by finding all consecutive frames later than the first frame in the TX buffer that meet the defined lower priority threshold, $P_{1th}$ (operation 532). In this example, the first two B-frames 408, 410 occupying the second and third positions of the TX buffer are the frames that meet this condition 408, 410, considering that they meet the lower priority threshold and they are consecutive to each other and immediately follow the first frame in the TX buffer 406 (operation 532). The first B-frame 408 has a priority of "2," while the second B-frame has a priority value of "1." In this example, this potential drop set of low priority consecutive frames does not include the later P-frame 412 considering that this P-frame has a priority of "6," which exceeds the lower priority threshold. Furthermore, the later B-frame 414 is not included considering that such B-frame, although meeting the lower priority threshold, is not immediately contiguous or consecutive with the B-frame 410. Based on this set potential drop set of low priority consecutive frames 608, a determination of the available number of frames that may be dropped is performed. In this example, J' is set to "2" 620 considering that the potential drop set 608 contains only two frames. One of ordinary skill in the art will appreciate that the number of frames in this potential drop set 608 may be determined based on information, such as metadata, associated with the frames. For example, in real time transport protocol (RTP), the sequence number and/or timestamp may provide indication of the order, as well as the count and/or position of frames in the TX buffer and/or the offset away from the first frame in the TX buffer.

Let us further assume for illustrative purposes that the frames associated with the exemplary source content present videos at 30 fps and the maximum deadline adjustment value, $J_{max}$, is "3" 650. The value of J indicating the available number of frames that may be dropped is thus assigned to "2"— i.e., the minimum of $J_{max}$ and J' 652 (operation 534). Let us further assume that for illustrative purposes, that k after calculation is defined to be equal to "2," based on the estimated time for transmitting the first frame 406 and the delivery deadline of such frame 406 (operation 538). Considering that the value of k is equal to the value of J (operation 552, "yes" branch), one or more frames are dropped to accommodate the transmission of the first frame 406 (operation 556). In this example, all the frames 408, 410 in the potential drop set 608 are dropped. In general, all frames starting from the second frame in the TX buffer up to the frame k+1=3, i.e., up to the third frame in the TX buffer 408, 410, 632 are dropped (operation 556).

The timestamp of the first frame 406 is also accordingly modified, such that the original timestamp of "33 ms" of the I-frame, fr1, 406 (FIG. 4) is modified to be the timestamp of the last frame in the transmission buffer that is dropped, i.e., the third frame, which in this example is the second B-frame 410. The timestamp of that B-frame fr3 410 is "100 ms." The first frame 406 in the TX buffer 406, 612 is thus modified (operation 558) and transmitted 630, 636 such that the timestamp of this I-frame 406 is now "100 ms" 494 rather than the original "33 ms." In this embodiment, the frame data, which may include metadata associated with this frame is modified such that the frame 406 when received is associated with the "100 ms" timestamp. In this exemplary embodiment, the EDA process thus transmits the first I-frame 406 with a modified and delayed timestamp and drops the first two B-frames 408, 410, 632. Once received by the receiver, the frame 406 previously not included in the APT set 602, is accordingly decoded and presented at the receiver based on the modified timestamp. In general, after transmission of the first I-frame 406 and the dropping of the appropriate frames 408, 410, the TX buffer now has the P-frame 412 at the front of the TX buffer 690, i.e., a new frame at the start of the TX buffer (FIG. 6B). This exemplary representation of the TX buffer 690 may be construed to be at time t+1 or at a new transmission opportunity. Furthermore, new frames 698 may be added at the end of the TX buffer 692, 694, 696. These new frames are a B-frame with priority of "2" 692, a P-frame with a priority of "6," and another B-frame with a priority of "1" 696. The EDA process in general is repeated as shown, for example, a new APT subset is determined and the processed described herein is repeated for this new transmission opportunity and for this new set of frames contained in the TX buffer 690.

In other embodiments, the first frame fr1 or $fr(t_1^T, b_1^T, p_1^T)$ may be transmitted without changing its timestamp, $t_1^T$, but in this embodiment the value of k may be sent in a separate custom field, which may be part of a metadata or data structure, to indicate to the client/receiver that the frame $fr(t_1^T, b_1^T, p_1^T)$ may be displayed at any time between a range of delivery deadlines $(d_1^T, d_{1+k}^T)$, so long as the frame fr1 arrives before time $d_{1+k}^T$, for example. This custom field thus may provide a range of time values. In this embodiment, a frame may be associated with a timestamp, size, priority, and an offset value k so as to indicate the appropriate range of time values.

In other embodiments, the potential drop set 608 and/or J' may be selected based on not only the priority value of the next frames $fr(t_{1+j}^T, b_{1+j}^T, i_{1+j}^T)$ but also based on their contribution to the reduction in distortion. In this embodiment, the EDA process may include a distortion module, not shown, adapted to calculate, for example, the increase in distortion resulting from dropping or not transmitting a particular frame. In this embodiment, a distortion threshold may also be implemented, such that frames are dropped if they meet a distortion threshold, for example. In another embodiment, the reduction in distortion estimated due to sending the frame $fr(t_1^T, b_1^T, i_1^T)$, which otherwise is not sent based on the APT process and/or not received by the receiver before its deadline, is compared to the reduction in distortion caused by sending frames $fr(t_{1+j}^T, b_{1+j}^T, i_{1+j}^T)$ to make a decision to whether to apply explicit deadline adjustment to frame $fr(t_1^T, b_1^T, i_1^T)$ and also to decide the value of J', for example.

Figure 7:
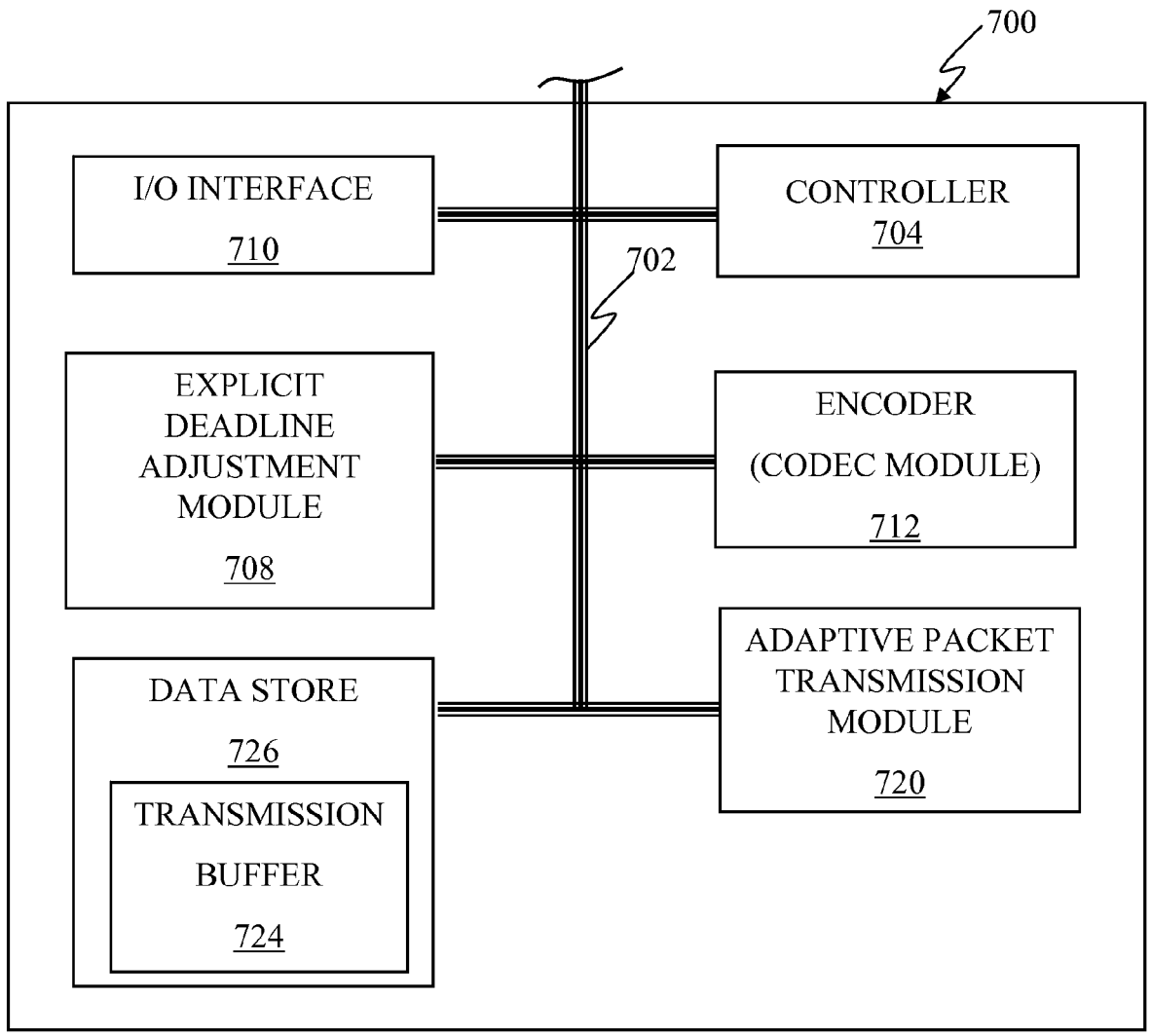
FIG. 7 is a high-level block diagram of an exemplary sender or sending entity, according to an embodiment of the invention.

FIG. 7 is an exemplary sender device 700 adapted to perform the EDA process described herein, according to an embodiment of the invention. The exemplary sender 700 typically includes an input/output I/O interface card 710 adapted to enable the sender 700 to communicate with the network. The sender 700 also includes a data store 726, which may be volatile or non-volatile memory. Such a data store may contain the transmission buffer 724, which typically temporarily stores data units or frames ready for processing by the explicit deadline adjustment (EDA) module 708. The EDA module 708 in general is adapted to perform the EDA process described herein, which may include determining the potential drop set, the number of available frames for dropping, the actual count/number of frames to be dropped, and/or the time modification of the frame. The EDA module 708 may also be adapted to transmit and/or drop the appropriate frames contained in the transmission buffer 724. The device controller 704 of the sender 700 is typically adapted to control the overall functions of the sender device 700. In some embodiments, the sender may also include an encoder or codec module 712 adapted to encode source content, particularly, if the sender also performs the encoding process. In some embodiments of the invention, the sender may also include an adaptive packet transmission module 720 adapted to determine the APT subset of the transmission buffer based on one or more conditions. In some embodiments, the different modules in FIG. 7 may communicate and interface with each other via a bus, dedicated signal paths or one or more channels 702. Depending on the function of the device, other modules, including functions and capabilities, may be added or removed. Furthermore, the modules described herein may be further subdivided and combined with other functions so long as the function and processes described herein may be performed. The various modules may also be implemented in hardware, software, or both, i.e., firmware. Furthermore, some of the modules 700 in the exemplary sender device may be embodied in a different device or application, such that the sender 700 may interface with other such sender devices or applications. For example, the APT module 720 may be embodied in a different device and the sender 700 interfaces with this other device embodying the APT module, such as being able to receive or read the APT subset determined by the APT module 720.

Experimental Results:

The EDA feature described herein was implemented using Network Simulator (NS2), with some modifications. The NS2 network simulator may be obtained from http://www.isi.edu/nsnam/ns/. A number of simulations were performed to evaluate the performance of the explicit deadline adjustment (EDA) process described herein. The performance of the EDA process with that of a transrater and also with the combination of transrater, adaptive packet transmission (APT), and EDA were compared.

The EDA process was implemented on top of a base-line exemplary content-aware adaptive packet transmission algorithm disclosed in the Content-Aware U.S. Application. As mentioned above, other APT processes may be employed and yet still be in the scope of the present invention. The experiments were conducted over an 802.11a-type network using a high definition (HD) video source content with 1280×720 resolution and 60 fps original sequence.

Figure 8:
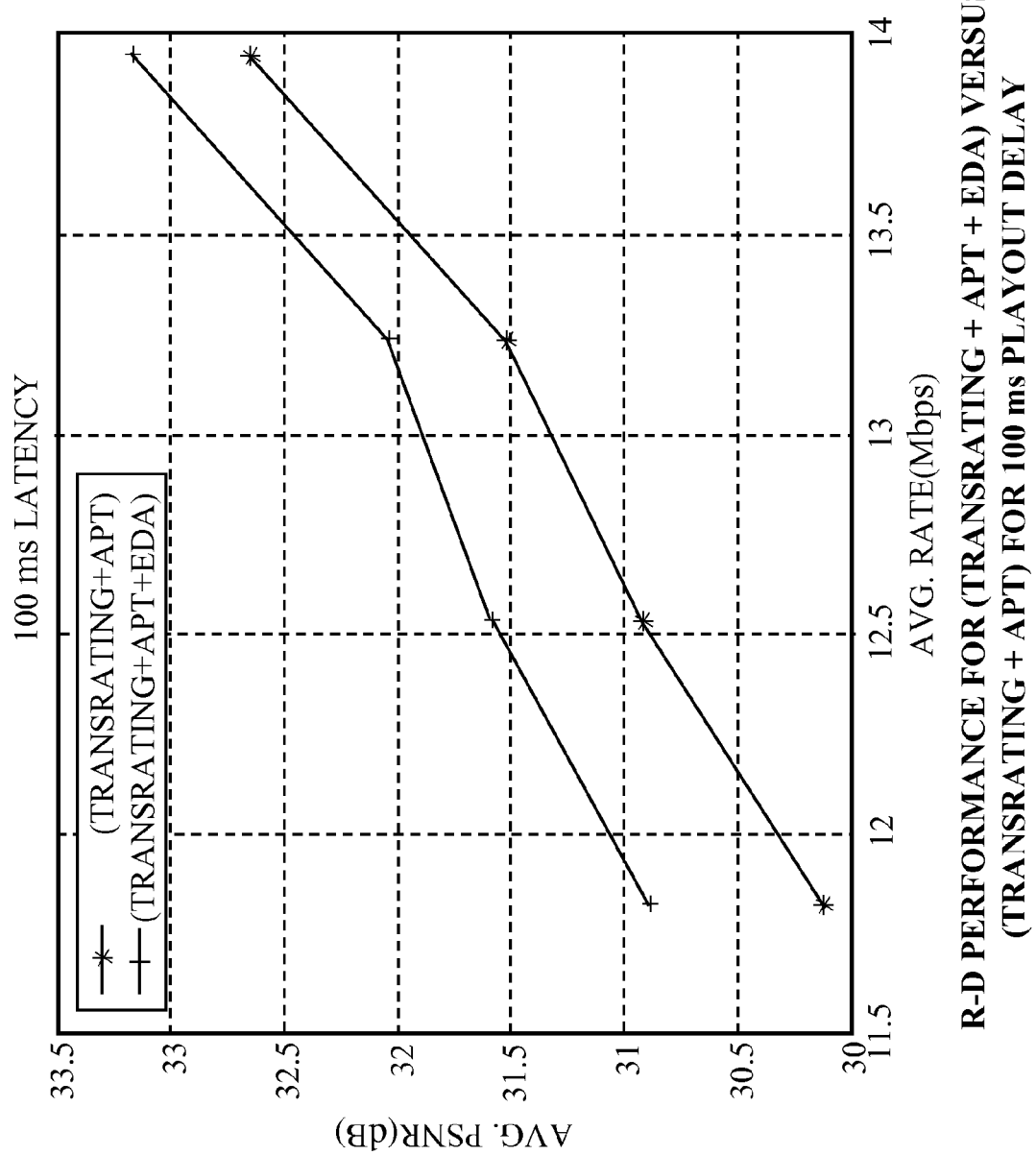
FIG. 8 is an exemplary graph showing a rate-distortion performance comparison between a process applying adaptive packet transmission (APT) with transrating and a process applying APT with transrating and EDA, according to an embodiment of the invention.

FIG. 8 shows the rate-distortion (R-D) performance comparison for adaptive packet transmission for 100 msec playout delay, respectively for the following two cases: a) transrating+APT+EDA, and b) transrating+APT.

One of ordinary skill in the art will appreciate that various software or programming techniques may be applied to perform the process described herein, such as counters, flags, arrays, variables, and the like. Furthermore, embodiments of the present invention may be used in conjunction with networks, systems, and devices that stream source content. Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of transmitting, between a sender and a receiver, a data stream, wherein the data stream comprises a plurality of data units in a transmission order in a buffer, wherein the plurality of data units comprises a first data unit at the front of the buffer and other data units following the first data unit, the method comprising the steps of:

determining a first set of one or more data units based on the data units in the buffer, wherein each data unit in the first set is marked for transmission based on a transmission condition;

reading the first data unit at the front of the buffer; and if the first data unit is not part of the determined first set of data units and a priority associated with the first data unit meets an upper threshold condition, then determining a second set of one or more data units, wherein the second set of data units comprises one or more data units later in the transmission order than the first data unit, each of the data units in the second set meets a lower priority threshold and the data units in the second set are in a consecutive transmission order and one of the data units in the second set is a data unit second in transmission order in the buffer;

determining one or more data units in the buffer to be dropped based on the determined second set of data units;

dropping the determined one or more data units in the buffer; and transmitting, by a transmitter, the first data unit in the buffer with the first data unit associated with a modified time value;

wherein the modified time value comprises an offset value to provide a range of time values, wherein the range of time values indicate to a receiver that the transmitted first data unit is presented at a time between a presentation deadline associated with the first data unit and a presentation deadline of a data unit that is a number of position away from the first data unit, wherein the number of position away is the offset value.

2. The method of claim 1, wherein the modified time value is based on a timestamp associated with a dropped data unit of the step of dropping the determined one or more data units, wherein the dropped data unit is a data unit with a timestamp last in the transmission order from among the dropped data units.

3. The method of claim 2, wherein the receiver presents the first data unit based on the modified time value which is based on the timestamp.

4. The method of claim 1, wherein the receiver presents the first data unit within the range of time values.

5. The method of claim 1, wherein the step of determining the one or more data units to be dropped in the buffer comprises the steps of:

determining an available number of data units from the second set of data units based on a defined maximum value and a count of frames in the second set of data units;

determining an actual number of data units to be dropped based on an estimated time to deliver the first data unit, an estimated delivery deadline of the first data unit, and a frame rate per second; and wherein the step of dropping the determined one or more data units in the buffer is performed if the actual number of data units to be dropped may be accommodated by the determined available number of data units from the second set of data units.

6. The method of claim 1, further comprising the step of:
transmitting the first data unit with a timestamp associated with an encoding process when the first data unit is part of the determined first set of data units.

7. The method of claim 1, further comprising the step of:
if the first data unit is not part of the determined first set of data units and the priority associated with the first data unit does not meet the upper threshold condition, then dropping the first data unit in the buffer.

8. The method of claim 1, further comprising the steps of:
removing one or more data units in the buffer;
repeating the steps of claim 1 at another transmission opportunity, if there is at least one data unit in the buffer.

9. The method of claim 1, further comprising the step of:
if the first data unit is part of the determined first set of data units then transmitting the first data unit in the buffer.

10. A method of transmitting, between a sender and a receiver, a data stream, wherein the data stream comprises a plurality of data units in a transmission order in a buffer, wherein the plurality of data units comprises a first data unit at the front of the buffer and other data units following the first data unit, the method comprising the steps of:

determining a first set of one or more data units based on the data units in the buffer, wherein each data unit in the first set is marked for transmission based on a transmission condition;

reading the first data unit at the front of the buffer; and if the first data unit is not part of the determined first set of data units and a priority associated with the first data unit meets an upper threshold condition, then determining a second set of one or more data units, wherein the second set of data units comprises one or more data units later in the transmission order than the first data unit, each of the data units in the second set meets a lower priority threshold and the data units in the second set are in a consecutive transmission order and one of the data units in the second set is a data unit second in transmission order in the buffer;

determining an available number of data units from the second set of data units based on a defined maximum value and a count of frames in the second set of data units;

determining an actual number of data units to be dropped based on an estimated time to deliver the first data unit, an estimated delivery deadline of the first data unit, and a frame rate per second; and if the actual number of data units to be dropped may be accommodated by the determined available number of data units from the second set of data units, then dropping one or more data units in the buffer based on the actual number of data units and transmitting, by the transmitter, the first data unit in the buffer with the first data unit associated with a modified time value;

wherein the modified time value comprises an offset value to provide a range of time values, wherein the range of time values indicate to a receiver that the transmitted first data unit is presented at a time between a presentation deadline associated with the first data unit and a presentation deadline of a data unit that is a number of position away from the first data unit, wherein the number of position away is the offset value.

11. A device configured to be operably coupled to a network, the device comprising: a buffer configured to store data units associated with a source content, said source content comprising a plurality of data units, wherein the plurality of data units comprises a first data unit at the front of the buffer and other data units following the first data unit; and an explicit deadline adjustment (EDA) module configured to: read the first data unit at the front of the buffer; receive a first set of one or more data units based on the data units in the buffer, wherein each data unit in the first set is marked for transmission based on a transmission condition; and if the first data unit is not part of the determined first set of data units and a priority associated with the first data unit meets an upper threshold condition, then determine a second set of one or more data units, wherein the second set of data units comprises one or more data units later in the transmission order than the first data unit, each of the data units in the second set meets a lower priority threshold and the data units in the second set are in a consecutive transmission order and one of the data units in the second set is a data unit second in transmission order in the buffer;

determine one or more data units in the buffer to be dropped based on the determined second set of data units;

drop the determined one or more data units in the buffer; and transmit the first data unit in the buffer with the first data unit associated with a modified time value;

wherein the modified time value comprises an offset value to provide a range of time values, wherein the range of time values indicate to a receiver that the transmitted first data unit is presented at a time between a presentation deadline associated with the first data unit and a presentation deadline of a data unit that is a number of position away from the first data unit, wherein the number of position away is the offset value.

12. The device of claim 11, further comprising: an adaptive packet transmission (APT) module configured to: determine the first set of one or more data units based on the data units in the buffer, wherein each data unit in the first set is marked for transmission based on a transmission condition; and transmit the determined first set to the EDA module.

13. The device of claim 11, wherein the modified time value is based on a timestamp associated with a dropped data unit dropped by the EDA module and wherein the dropped data unit is a data unit with a timestamp last in the transmission order from among the dropped data units.

14. The device of claim 11, wherein the EDA module is further configured to: determine an available number of data units from the second set of data units based on a defined maximum value and a count of frames in the second set of data units; determine an actual number of data units to be dropped based on an estimated time to deliver the first data unit, an estimated delivery deadline of the first data unit, and a frame rate per second; and drop the determined one or more data units in the buffer, if the actual number of data units to be dropped may be accommodated by the determined available number of data units from the second set of data units.

15. The device of claim 11, wherein the EDA module is further configured to: drop the first data unit in the buffer, if the first data unit is not part of the determined first set of data units and the priority associated with the first data unit does not meet the upper threshold condition.

16. A system comprising: a sender operably coupled to a receiver via one or more network segments, the sender comprising:

a buffer configured to store data units associated with a source content, said source content comprising a plurality of data units, wherein the plurality of data units comprises a first data unit at the front of the buffer and other data units following the first data unit; and an explicit deadline adjustment (EDA) module configured to: read the first data unit at the front of the buffer; and receive a first set of one or more data units based on the data units in the buffer, wherein each data unit in the first set is marked for transmission based on a transmission condition; and if the first data unit is not part of the determined first set of data units and a priority associated with the first data unit meets an upper threshold condition, then determine a second set of one or more data units, wherein the second set of data units comprises one or more data units later in the transmission order than the first data unit, each of the data units in the second set meets a lower priority threshold and the data units in the second set are in a consecutive transmission order and one of the data units in the second set is a data unit second in transmission order in the buffer;

determine one or more data units in the buffer to be dropped based on the determined second set of data units;

drop the determined one or more data units in the buffer; and transmit the first data unit in the buffer with the first data unit associated with a modified time value;

wherein the modified time value comprises an offset value to provide a range of time values, wherein the range of time values indicate to a receiver that the transmitted first data unit is presented at a time between a presentation deadline associated with the first data unit and a presentation deadline of a data unit that is a number of position away from the first data unit, wherein the number of position away is the offset value;

and said receiver configured to receive the transmitted data units transmitted by the transmitter.

17. The system of claim 16, wherein the receiver is configured to present the transmitted data units transmitted by the sender, wherein at least one of the transmitted data units is a data unit with the modified time value, and wherein the receiver is configured to present the at least one of the transmitted data units based on the modified time value which is based on the timestamp.

18. The system of claim 16, wherein the EDA module of the sender is further configured to: determine an available number of data units from the second set of data units based on a defined maximum value and a count of frames in the second set of data units; determine an actual number of data units to be dropped based on an estimated time to deliver the first data unit, an estimated delivery deadline of the first data unit, and a frame rate per second; and drop the determined one or more data units in the buffer, if the actual number of data units to be dropped may be accommodated by the determined available number of data units from the second set of data units.

* * * * *